United States Patent [19]

Gillade

[11] 4,406,178

[45] Sep. 27, 1983

[54] POWER TRANSMISSION

[76] Inventor: Frans P. Gillade, 196 Bradley Ave., Welland, Ontario, Canada

[21] Appl. No.: 241,558

[22] Filed: Mar. 9, 1981

[30] Foreign Application Priority Data

Mar. 10, 1980 [GB] United Kingdom ............. 8007974

[51] Int. Cl.³ .............................................. F16H 37/00
[52] U.S. Cl. ........................................ 74/689; 74/681; 74/802
[58] Field of Search ................. 74/689, 802, 740, 681

[56] References Cited

U.S. PATENT DOCUMENTS

| 2,467,226 | 4/1949 | Place ................................ 74/681 |
| 2,745,297 | 5/1956 | Andrus ............................. 74/689 |
| 2,889,716 | 6/1959 | Doty ................................. 74/689 |
| 3,340,749 | 9/1967 | Magg et al. ...................... 74/689 |
| 4,305,488 | 12/1981 | McIntosh ........................ 74/689 X |

FOREIGN PATENT DOCUMENTS

| 894638 | 2/1943 | France ............................. 74/689 |
| 326314 | 4/1930 | United Kingdom ............. 74/689 |

Primary Examiner—Leslie A. Braun
Assistant Examiner—Frank H. McKenzie, Jr.
Attorney, Agent, or Firm—Michael I. Stewart

[57] ABSTRACT

An infinitely-variable bi-directional power transmission utilizes the differential in power input applied to members of a planetary gear set to control the speed and direction of rotation of a power output shaft also connected to the planetary gear set.

3 Claims, 2 Drawing Figures

4,406,178

POWER TRANSMISSION

FIELD OF INVENTION

The present invention relates to a power transmission.

BACKGROUND TO THE INVENTION

There have been many prior suggestions to provide infinitely-variable power transmissions and a few prior suggestions to provide a bi-directional function in such transmissions. However, these prior systems have not met with any significant commercial success owing to limitations in their use, for example, power restrictions resulting from size limitations, and none has been utilized in automobile power transmissions.

SUMMARY OF INVENTION

The present invention provides a power transmission of compact form which is bi-directional and has an infinitely-variable transmission ratio. The transmission of this invention is capable of handling wide ranges of power input without losing its compact size and is capable of use in many transmission applications, including automobile use.

The present invention utilizes a combination of a planetary gear set and a variable speed pulley set to provide the variation and bi-directional function. In the present invention, differentials of rotational speed are applied by means of variable speed pulleys to the gear set members from the power input and thereby the power output from the gear set may be infinitely and bidirectionally varied.

DESCRIPTION OF PREFERRED EMBODIMENTS

Figure 1:
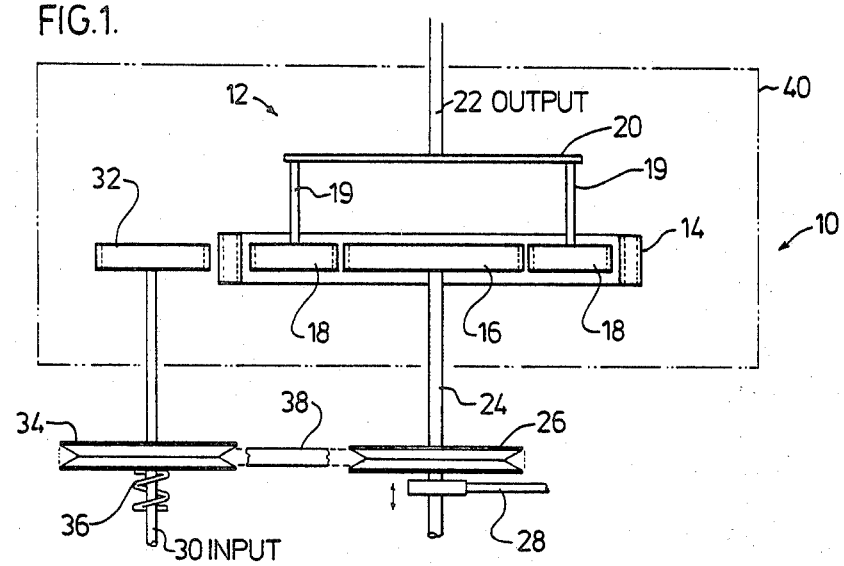
FIG. 1 is a schematic representation of a power transmission mechanism in accordance with one embodiment of the invention.

Referring first to FIG. 1, a bi-directional infinitely-variable power transmission mechanism 10 includes a planetary gear system 12 comprising a ring gear 14, a sun gear 16 and a pair of planet gears 18 arranged in meshing engagement both with the sun gear 16 and the ring gear 14. The axles 19 on which the planet gear 18 are rotatably mounted are joined by a cross arm or disc 20 from which protrudes a power output shaft 22 coaxially arranged with the ring gear 14 and the sun gear 16.

The axle 24 of the sun gear 16 has a variable pulley 26 mounted thereon for rotation therewith, variation of the ratio of the pulley 26 being controlled in the illustrated embodiment by a lever arrangement 28, which varies the distance between the two halves of the variable pulley 26. A power input shaft 30 has a gear wheel 32 mounted thereon in meshing engagement with the outer surface of the ring gear 14.

The input shaft 30 has a second variable pulley 34 mounted therein for rotation therewith and having a spring 36 mounted on the shaft normally urging the variable pulley 34 towards its highest ratio. An endless pulley belt 38 joins the variable pulleys 26 and 34, so that rotation of pulley 34 on the input shaft 30 causes rotation of the pulley 26 and hence shaft 24. The spring 36 ensures a constant tension in the belt 38 irrespective of the position of the lever 28.

The various gears may be housed in a suitable housing 40 containing suitable lubrication. The shafts 24 and 30 entering the housing 40 and the output shaft 22 leaving the housing 40 may be journalled in suitable bearings.

In operation, power input received by shaft 30 causes rotation of pulley 34 and gear 32 (for example, clockwise). Rotation of the gear 32 causes rotation of the ring gear 14 while rotation of the pulley 34 causes rotation of the pulley 26 and through shaft 24 the sun gear 16, the speed of rotation of the sun gear 16 relative to the speed of rotation of the input shaft 30 depending on the pulley ratio of pulleys 26 and 34, as determined by the setting of the lever 28.

The relative speeds of rotation of the sun gear 16 and the ring gear 14, which rotate in opposite directions, determines the planetary motion, if any, of the planetary gears 18 relative to the sun gears 16 and the ring gear 14 and hence the speed of rotation of the shaft 22 and thereby the power output. For example, if the sun gear 16 transmits as many teeth clockwise as the ring gear 14 transmits counterclockwise, then the planet gears 18 remain stationary and the output shaft 22 is stationary, i.e. there is no output irrespective of the input. However, if the ratio of pulley 26 is varied by operation of the manual lever 28, either to increase or decrease its working diameter, then the sun gear 16 will transmit more or less teeth clockwise than the ring gear 14 transmits counterclockwise, causing the planet gears to move in one direction or the other around the sun gear 16, thereby causing rotation of the output shaft 22 in one direction or the other. The speed of the planetary motion of the gears 18 and hence the speed of rotation of the output shaft depends upon the relative motions of the ring gear 14 and the sun gear 16.

It will be seen, therefore, that at a constant horsepower input, the output power may be varied at will by manipulation of the diameter or ratio of pulley 26. The direction of rotation of the output shaft 22 may be the same as or opposite to the direction of rotation of the input shaft 30.

The power transmission mechanism of FIG. 1, therefore, is bi-directional and has an infinitely-variable ratio for a constant horsepower input and is extremely compact.

The change in diameter of the pulley 26 is illustrated in FIG. 1 as being controlled by the manual lever 28. The lever 28 may be released by any other convenient means. For example, if the transmission 10 is used in association with an automobile powered by an internal combustion engine, the lever 28 may be replaced by a vacuum diaphragm, the speed governor or both. When the transmission 10 is modified in this way, greater versatility is introduced, permitting for maximum horsepower input, constant speed input or output, or any combination.

Figure 2:
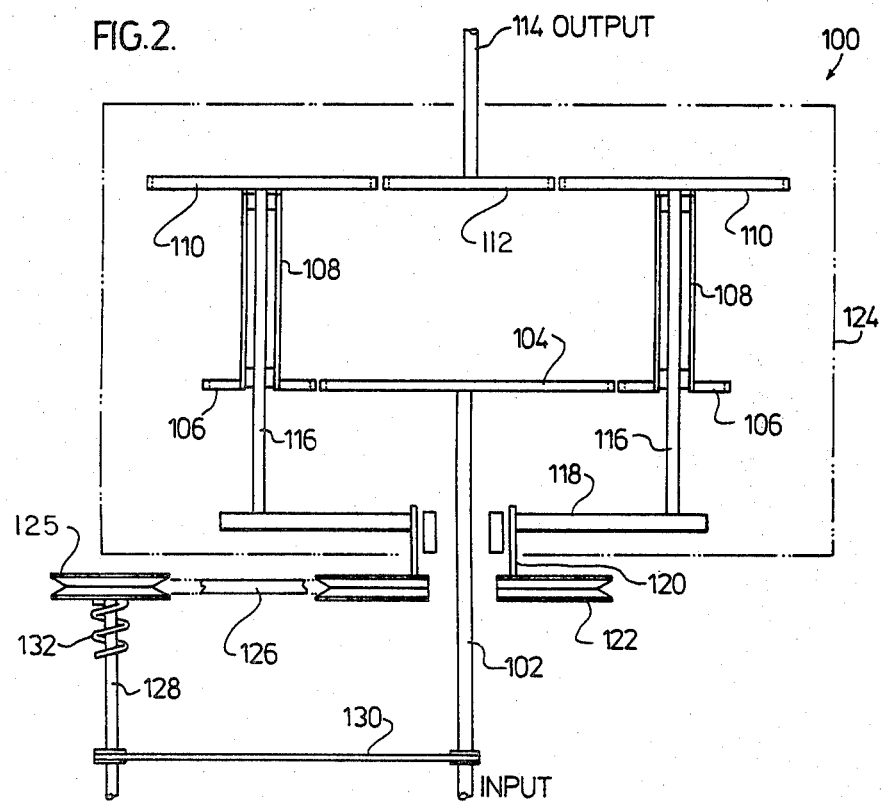
FIG. 2 is a schematic representation of a power transmission mechanism in accordance with a second embodiment of the invention.

FIG. 2 illustrates a second form of the invention which is particularly useful in automobile applications by variation of pulley diameter using a bi-directional governor and a vacuum operated diaphragm connected to a vehicle manifold. (This mechanism is not illustrated). Referring to FIG. 2, a power transmission mechanism 100 comprises an input shaft 102 on which is fixedly mounted a sun gear 104 for rotation with the input shaft 102. The sun gear 104 meshes with a first pair of planetary gear wheels 106 mounted to hollow shafts 108. A second pair of planetary gear wheels 110 is also mounted on the hollow shafts 108 and mesh with a second sun gear wheel 112 fixedly mounted on an output shaft 114.

The planetary gear wheels 110 are also rotatably mounted on shafts 116 which pass through the hollow shafts 108 in rotatable relationship thereto and are fixedly mounted in a disc 118 or arm members. Disc 118 is fixedly mounted on sleeve 120 to which a variable diameter pulley 122 also is fixed. The input shaft 102 passes through sleeve 120 in relatively rotatable relation by use of suitable bearings. The various gear wheels may be positioned in a suitable housing 124, which may contain any suitable lubricant.

The variable diameter pulley 122 is connected in driving relationship with a second variable diameter pulley 125 through a pulley belt 126. The variable diameter pulley 125 is fixedly mounted on a shaft 128 which is connected in driven relationship with the input shaft 102 through timing belt 130. A tensioning spring 132 also is provided in association with the pulley 125 to maintain the tension in the belt 126 irrespective of the working diameters of the pulleys 122 and 125.

The working diameter of the pulley 125 may be varied through the actions of a bi-directional governor mechanism and a spring-loaded self-centering vacuum operated diaphragm connected to a vehicle intake manifold, so as to vary the working diameter of the pulley 125 in accordance with intake manifold vacuum.

The operation of the embodiment of FIG. 2 is similar to that of FIG. 1, relying on variations in relative speed of certain gears to effect variations in output speed. Rotation of input shaft 102 causes sun gear 104 to rotate and through the planet gears 106 causes the hollow shafts 108 and the planetary gears 110 to rotate.

The interconnection between the input shaft 102 and the shaft 128 through timing belt 130 causes pulley 125 to rotate with variable speed depending on its effective working diameter. This in turn drives the pulley 122 and causes disc 118 to rotate. The latter rotation causes the planetary gears 110 to rotate relative to the gear 112 connected to the output shaft 114.

The relative speeds of rotation of the sun gear 104 and the disc 118, therefore, determine the speed of rotation of the output shaft 114. As in the case of FIG. 1, the transmission is infinitely-variable and bi-directional.

SUMMARY OF DISCLOSURE

The power transmission mechanism of the present invention is relatively simple in construction and yet extremely versatile in operation. The unit is compact in size and utilizes only a few moving parts. Modifications are possible within the scope of this invention.

What I claim is:

1. An infinitely-variable bi-directional power transmission, comprising:
    a power input shaft,
    a gear wheel fixedly mounted on said input shaft for rotation therewith,
    a power output shaft,
    a planetary gear set comprising a sun gear fixedly mounted on said output shaft for rotation therewith and pair of planetary gears meshing with said sun gear,
    first and second axle shafts, one member of said pair of planetary gears being rotatably mounted on each of said axle shafts,
    means establishing torque delivery between said gear wheel and said planetary gears,
    a first variable ratio pulley fixedly mounted on a second shaft for rotation therewith,
    means establishing driven communication between said input shaft and said second shaft whereby said second shaft is driven by said input shaft,
    a second variable ratio pulley rotatably mounted with respect to said input shaft,
    endless belt means mounted about said first and second variable ratio pulleys whereby rotation of said second shaft by said input shaft also causes rotation of said second pulley, and
    means fixedly connecting said first and second axle shafts with said second pulley whereby rotation of said second pulley causes said axle shafts to each follow a circular path.

2. The transmission of claim 1 wherein said means establishing torque delivery between said gear wheel and said planetary gears comprises gears meshing with said gear wheel and attached to cylindrical members which are fixedly connected to the planetary gear wheels and surround said axle shafts.

3. The transmission of claim 7 including means controlling the effective diameters of said first pulley whereby the relative speed of said output shaft with respect to said input shaft may be varied.

* * * * *